Patented Oct. 22, 1946

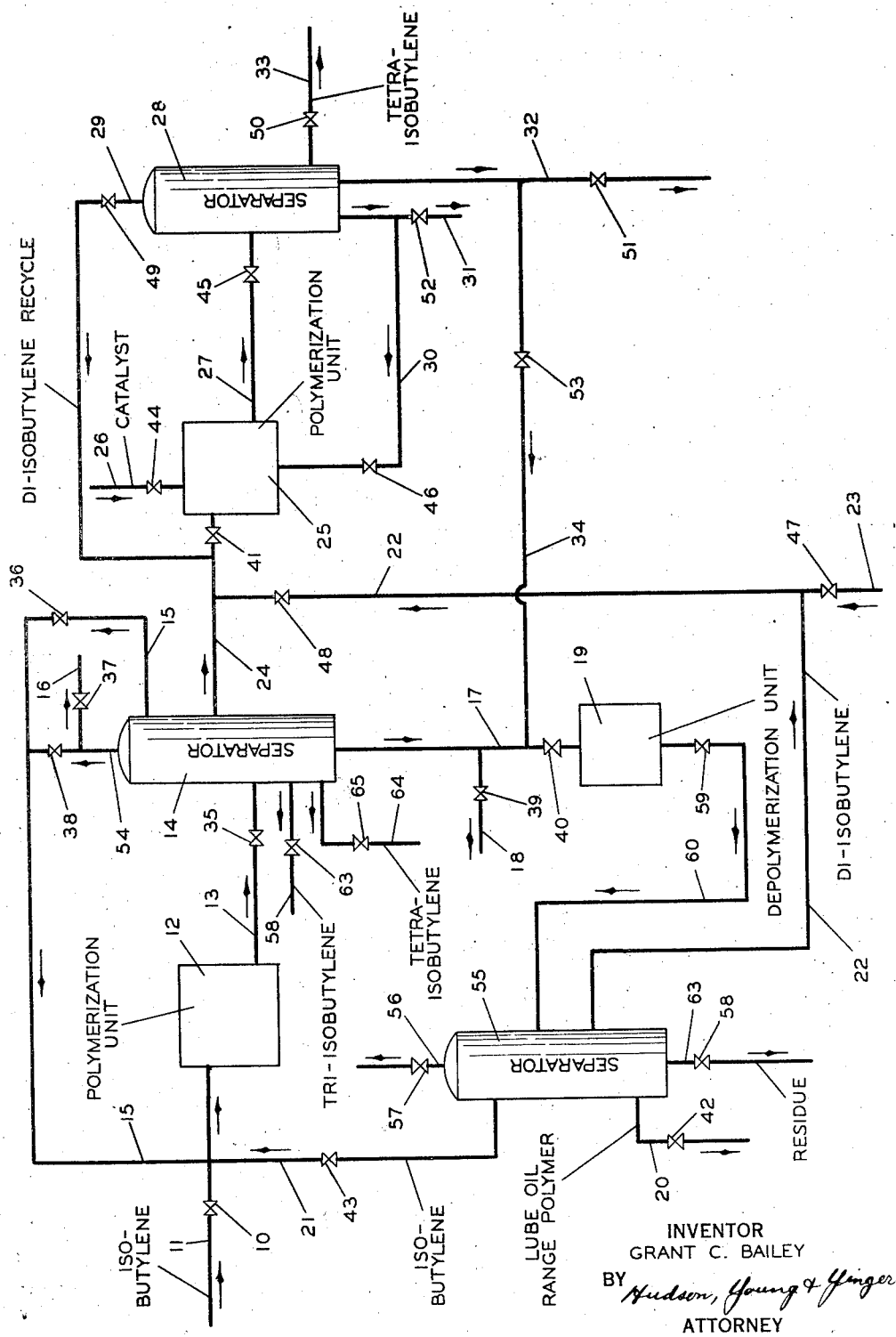

2,409,727

UNITED STATES PATENT OFFICE 2,409,727

PRODUCTION OF OLEFIN POLYMERS

Grant C. Bailey, Bartlesville, Okla., assignor to Phillips Petroleum Company, a corporation of Delaware Application January 30, 1942, Serial No. 428,966

5 Claims. (Cl. 260—683.15)

This invention relates to the catalytic polymerization of mono-olefins, and more particularly to the production of tetra-isobutylene from isobutylene and di-isobutylene.

Tetra-isobutylene is a mono-olefin containing 16 carbon atoms per molecule. Tetra-isobutylene exists in several isomeric forms possessing highly branched carbon structures and each structure possesses an active olefinic bond making it useful in the preparation of chemical derivatives of this particular olefin species through various reaction procedures. Hydrogenated tetra-isobutylene possesses a high octane number, making it useful as fuel of very low volatility in internal-combustion engines. It has a solidifying temperature below −100° C., making it useful at very low temperatures as a hydraulic fluid, for example. In many such applications, it is desirable to use a product having a particular molecular weight and boiling range, together with unique characteristics as previously suggested; tetra-isobutylene is especially suited for some of these applications.

The catalytic polymerization of mono-olefins to higher-molecular-weight products is well known. Isobutylene is one of the most reactive mono-olefins, and its polymerization using various catalysts and conditions and its polymerization products have been the subjects of many investigations. These products range from di-isobutylene, which is in the boiling range of gasoline, through oils, to viscous, rubber-like, and non-elastic resinous products. In any given reaction, the product usually contains a series of polymers of different molecular weights, each successive change in molecular weight corresponding to one molecule of monomer. The average molecular weight of a polymer product depends upon the catalyst and the polymerization conditions. Using highly active catalysts, such as aluminum chloride, the proportion of products of different molecular weights follows a probability distribution around the average molecular weight. In such cases the average molecular weight is a function of the temperature of polymerization, the lower the temperature the higher the average molecular weight.

In many cases where the polymerization catalyst is less active, such a probability distribution is not found. The rates of the formation of various polymeric forms may vary so greatly with temperature that true equilibrium conditions are never attained and the composition of the product depends upon the comparative rates of the competing reactions.

In the direct polymerization of an olefin to a polymer having a desired molecular weight, such as the polymerization of isobutylene to tetra-isobutylene, for example, polymers of both higher and lower molecular weight are formed. For any given catalysts, conditions can be found which give an optimum yield of the desired polymer, but the higher and lower polymers will be present in lesser, but substantial amounts.

This is illustrated by the data in Table I, which gives the product analysis of the liquid obtained from a run in which gaseous isobutylene was polymerized over activated floridin at room temperature.

Table I

| Component: | Per cent of total liquid |
|---|---|
| Di-isobutylene | 17 |
| Tri-isobutylene | 50 |
| Tetra-isobutylene | 17 |
| Penta-isobutylene | 5 |
| Hexa-isobutylene | 1 |
| Hepta-isobutylene | 0.5 |
| Residue | 9.5 |
| | 100.0 |

Orthophosphoric acid also readily polymerizes isobutylene. The product which was obtained when isobutylene was polymerized with orthophosphoric acid at 30° C. comprised essentially di- and tri-isobutylene, while at 130° C. seven isomeric polymers were produced.

Sulfuric acid readily brings about the polymerization of isobutylene to products containing di-isobutylene, tri-isobutylene, and higher polymers. At relatively low temperatures and low acid concentrations, relatively high proportions of dimer are produced. As the temperature and acid concentration are increased, the proportion of higher-molecular-weight polymers, trimer and tetramer especially, and the complexity of the polymer are increased. At still higher temperatures, the average molecular weight of the product decreases, as a result of extensive changes in the hydrocarbons during polymerization.

Metal halide catalysts, such as aluminum chloride, boron fluoride, and the like, are very active, bringing about the rapid polymerization of isobutylene to relatively high-molecular-weight compounds. At temperatures of −80 to −100° C., isobutylene is converted to resinous or plastic polymers of very high molecular weight. At 80° C., the polymer product contains olefins ranging from gasoline to lubricating oils, or dimers to decamers and sometimes higher. With increase in temperature of reaction, there is produced a decrease in the average molecular weight of the product and an increase in the complexity of the polymer or in the other reactions accompanying simple polymerization.

In all such catalytic polymerization systems, one polymer is often produced in somewhat higher proportion, but always with substantial amounts of polymers of higher and lower molecular weights accompanying it. The preparation of a product containing only trimer or only tetramer is thus not possible in the conventional polymerization system. However, it has been found possible by proper selection of a catalyst and a reaction system to limit markedly the reaction so that dimer alone is produced in high concentration.

Two factors contribute to high maximum yields of dimers as contrasted to the lower maximum yields of any higher-molecular-weight product. Firstly, there is no polymer having a molecular weight lower than the desired product. Secondly, the conversion to each successively higher-molecular-weight polymer requires greater catalyst activity than the previous conversion. Therefore, careful selection of catalyst and conditions minimizes the formation of higher polymers. Several combinations of catalysts and conditions have been found by various workers whereby di-isobutylene can be prepared from isobutylene in yields of 80% or greater.

I have now found that di-isobutylene can be converted to tetra-isobutylene in high yields using phosphorus pentoxide as a catalyst. This invention affords a method of converting isobutylene to tetra-isobutylene in high yields and more readily than was previously possible. This is accomplished by using a two-step process comprising polymerizing isobutylene to di-isobutylene under conditions that produce high yields of di-isobutylene, separating this dimer from other products and converting it to tetra-isobutylene using phosphorus pentoxide as catalyst.

It is an object of my invention to convert a low-boiling olfin to a higher-boiling olefin.

Another object of my invention is to produce an olefin polymer having a desired molecular weight in high yields from an olefin of lower molecular weight.

Another object is to rapidly polymerize a mono-olefin to a polymer of desired molecular weight in high yields.

Another object is to produce high yields of tetra-isobutylene.

Further objects and advantages of my invention will be apparent from the accompanying disclosure.

My invention will now be more particularly described and exemplified in connection with the drawing which is a schematic flow-diagram illustrating specific embodiments of the invention for the production of high yields of desired polymeric hydrocarbons from monomeric hydrocarbons.

Isobutylene, or a hydrocarbon mixture containing essentially isobutylene and other hydrocarbons substantially inert under the conditions at which isobutylene is subsequently converted, is passed through conduit 11 controlled by valve 10 to polymerization unit 12, wherein isobutylene is treated according to any of the processes well known in the art for the production therefrom of di-isobutylene in optimum yields with only small amounts of other polymeric hydrocarbons being produced. Sulfuric acid having a strength between 60 and 75 per cent is a particularly advantageous catalyst for such a conversion. Sulfuric acid of such strength can be used to selectively absorb isobutylene from a mixture of normally gaseous hydrocarbons. Upon heating such a sulfuric acid extract to about 100° C., isobutylene is polymerized to a product containing 80 per cent or more di-isobutylene. When the hydrocarbon stock charged through conduit 11 is rich in isobutylene, treatment in polymerization unit 12 with sulfuric acid as described will convert isobutylene to a product containing more than 90 per cent di-isobutylene.

I have found that good yields of di-isobutylene can also be obtained from isobutylene by treating an isobutylene-containing mixture with phosphorus pentoxide catalyst in the temperature range of about −5 to +15° C. and preferably from 0 to 10° C. As the temperature is decreased below −5° C., the rate of polymerization of isobutylene to di-isobutylene decreases very rapidly, and as the temperature of polymerization is increased above 15° C., the proportion of dimer in the product decreases rapidly, trimer becoming the main product. Using polymerization temperatures in the range of 0 to 10° C., 50 to 60 per cent yields of di-isobutylene can be obtained.

Effluent from polymerization unit 12 is passed through conduit 13 controlled by valve 35 to separator 14. Any unreacted isobutylene in the effluent from unit 12 is separated therefrom in separator 14 and passed through conduit 15 controlled by valve 36 to conduit 11 and thence to polymerization unit 12. When material lower-boiling than isobutylene is charged to my process through conduit 11 and is substantially inert under the conditions in unit 12, such material is removed from separator 14 and from my process through conduits 54 and 16 controlled by valve 37. When it is desirable to have such material present during the conversion of isobutylene in unit 12, it can be recycled from separator 14 through conduits 54 and 15 controlled by valve 38, when valve 37 in conduit 16 is wholly or partly closed. Tri-isobutylene produced in unit 12 is removed from separator 14 through conduit 58 controlled by valve 63 and may be further treated as appears desirable. Usually I prefer to pass such trimer material to depolymerization unit 19, the operation of which is subsequently described. Sometimes minor amounts of tetra-isobutylene are also produced in unit 12 and such material may be removed from separator 14 through conduit 64 controlled by valve 65 as a desirable product of my process.

Polymeric hydrocarbons boiling above the tetra-isobutylene range are removed from separator 14 through conduit 17 and, when such material is considered as undesirable in my process, it can be removed therefrom through conduit 18 controlled by valve 39. When, however, such high-boiling polymeric hydrocarbons can be depolymerized to useful materials, for example, they are passed through valve 40 in conduit 17 to depolymerization unit 19 when valve 39 in conduit 18 is wholly or partly closed. In unit 19 such polymers along with any trimer or tetramer passed thereto are depolymerized under suitable conditions of temperature, pressure, and reaction time, in the presence or absence of catalytic materials for promoting depolymerization reactions to produce monomeric olefins that can be advantageously used, such as isobutylene, tetra-isobutylene and even olefin hydrocarbon polymers in the lubricating-oil range. The depolymerization of high-molecular-weight olefin polymers to lower-molecular-weight hydrocarbons is well known. Such depolymerizations result in the regeneration of the original olefin from which the polymer was prepared together with low-molecular-weight olefin polymers, such as those in the gasoline boiling range. In these depolymerizations, negligible amounts of carbonaceous residues and hydrogen result. Generally, the amount of polymeric material boiling above di-isobutylene in the effluent of polymerization unit 12 will be quite small, and all such material may be charged to the depolymerization.

Effluent from the depolymerization unit 19 is passed through conduit 60 controlled by valve 59 to separator 55. In separator 55 any low-boiling material having less than four carbon atoms per molecule is removed from the system through conduit 56 controlled by valve 57. Usually the amount of this material will be very small and generally negligible. Isobutylene contained in the effluent from unit 19 is passed from separator 55 through conduit 21 controlled by valve 43 to conduit 11 wherein it is admixed with fresh charge stock to polymerization unit 12. A di-isobutylene fraction, which will sometimes constitute an appreciable portion of the effluent from depolymerization unit 19, is removed from separator 55 through conduit 22 and passed through valve 48 to conduit 24 and thence through valve 41 to polymerization unit 25 subsequently described herein.

Any hydrocarbon material having a higher boiling range than di-isobutylene and including material in the lube-oil boiling range is removed from separator 55 through conduit 20 controlled by valve 42. Material boiling above the lube-oil range, including tars and high boiling undepolymerized material from unit 19, is removed from separator 55 through conduits 63 controlled by valve 58. In some instances it will be desirable to return material removed through conduits 20 and/or 63 to the depolymerization unit 19 for conversion to additional quantities of di-isobutylene, either directly or indirectly, by means not shown in the drawing. Such operation is particularly advantageous when it is desirable to charge as much di-isobutylene to polymerization unit 25 as possible.

In polymerization unit 25 substantially pure di-isobutylene is contacted with phosphorus pentoxide under conditions for the production of optimum yields of tetra-isobutylene as disclosed herein. In some instances it will be desirable to charge di-isobutylene to my process from some outside source. This is conveniently done by means of conduit 23 controlled by valve 47. Phosphorus pentoxide is charged to polymerization unit 25 through conduit 26 controlled by valve 44. It may, however, be admixed with hydrocarbon charge stock to unit 25 by means not shown before said stock is admitted to unit 25 and under conditions which do not promote appreciable conversion of said hydrocarbon charge. In unit 25 phosphorus pentoxide is contacted with di-isobutylene charged thereto in a temperature range between about 0° C. and 100° C. and under a sufficient pressure that the hydrocarbon charge will be in the liquid phase. Within this temperature range the reaction is essentially dimerization of diisobutylene. No polymers higher-boiling than tetra-isobutylene are usually found in the product. Although the polymerization reaction in unit 25 proceeds more rapidly at higher temperatures, a range between about 20° C. and 60° C. is usually preferred. Atmospheric pressure is usually preferred in operations of this kind at the lower temperatures, although higher pressures can be used to advantage and pressures as high as 1000 pounds per square inch gage produce desirable results. The reaction time for carrying out this polymerization step is preferably in the range between three hours and seven hours although reaction times outside of this range have been found to produce substantial amounts of the desired product. When short reaction times are employed in unit 25 at any given temperature within the range disclosed, less di-isobutylene is polymerized per pass and, therefore, more di-isobutylene is recycled to unit 25 for further conversion to tetra-isobutylene. Long reaction times in unit 25 favor higher conversion per pass operation with an inherent less amount of recycle of unpolymerized di-isobutylene to unit 25. However, prolonged catalyst life and other factors may make it desirable to work with short reaction times and less polymerization per pass.

In unit 25 it is desirable to secure intimate contact between the phosphorus pentoxide catalyst and hydrocarbon material. To facilitate intimate mixing, materials which aid in dispersing the phosphorus pentoxide may be used, such as sand or lamp black. Efficient contact between catalyst and reactants is highly important in the polymerization step in unit 25.

The di-isobutylene charged to polymerization unit 25 is preferably quite pure and particularly free from oxygen-containing compounds, such as are readily formed when di-isobutylene is exposed to air or oxygen. The presence of oxygen-containing compounds in the di-isobutylene feed to unit 25 greatly decreases the rate of polymerization therein and necessitates the use of larger quantities of phosphorus pentoxide catalyst to produce satisfactory yields than when such oxygen-containing compounds are absent from unit 25.

Under the more favorable conditions discussed herein the phosphorus pentoxide catalyst is not rapidly deactivated. The useful life of the catalyst depends upon the rate at which it is deactivated by absorption of water and the rate at which sludge-like materials are built up by reaction with oxidized olefins or other reactive impurities.

Effluent from polymerization unit 25 is passed through conduit 27 controlled by valve 45 to separator 28. Phosphorus pentoxide catalyst is removed from the liquid by filtration, centrifuging, or any other suitable means well known to the art, and is then recycled to polymerization unit 25 by conduit 30 controlled by valve 46. When used catalyst has become so spent as to be uneconomical for conversion of additional di-isobutylene, such spent material or spent catalyst is removed from my process through conduit 31 controlled by valve 52 whereafter it may be disposed of or treated as appears desirable. Usually such spent material is regenerated to active catalytic material and recharged to unit 25 and/or to any other catalytic process or unit employing phosphorus pentoxide as a catalyst. Unreacted di-isobutylene is separated and recycled to polymerization unit 25 through line 29 controlled by valve 49. Desired tetra-isobutylene is removed from separator 28 through conduit 33 controlled by valve 50. It is readily obtained in a state of high purity since no isododecene or iso-eicosene is produced by the polymerization in unit 25, thereby affording a simple separation in separator 28. During an extended operation of my process small amounts of polymeric material higher boiling than tetra-isobutylene may be produced in unit 25 and can be removed from separator 28 through conduit 32 and from my process through valve 51. When such material is easily depolymerizable to a lower-molecular-weight polymer such as di-isobutylene, or to isobutylene, it is preferably charged to depolymerization unit 19 wherein a conversion is carried out as described herein.

My invention is further illustrated by the following examples which are recorded to disclose specific applications of my invention and are not intended to limit unnecessarily the scope or utility of the principles of my invention in any way.

EXAMPLE I

A steel pressure autoclave which was equipped with an efficient stirrer and an internal thermocouple was thoroughly cleaned and dried using a stream of dried nitrogen. Phosphorus pentoxide was introduced into the autoclave under anhydrous conditions. A charge stock consisting of 76 per cent isobutylene and 24 per cent isobutane was forced into the autoclave during a 5-hour period. The autoclave was cooled with ice, and the charging rate adjusted so that the internal temperature was held between 0 and 2° C. The unreacted isobutylene and isobutane were released from the reactor, and the polymer product filtered and fractionated. The product had the following composition:

*Table II*

| Component: | Volume per cent |
|---|---|
| Di-isobutylene | 58 |
| Tri-isobutylene | 17 |
| Tetra-isobutylene | 7 |
| Higher polymers | 18 |
| | 100 |

EXAMPLE II

The run cited in Example I was repeated except the temperature of the reaction was held at about 35° C. Fractionation of the product showed it to have the following composition:

*Table III*

| Component: | Volume per cent |
|---|---|
| Di-isobutylene | 20 |
| Tri-isobutylene | 60 |
| Higher polymers | 20 |
| | 100 |

EXAMPLE III

Twenty parts by weight of di-isobutylene and 1 part phosphorus pentoxide were agitated at 10–15° C. for seven hours. The catalyst was removed by filtration, and distillation of the product showed it to have the following composition:

*Table IV*

| | Volume per cent |
|---|---|
| Di-isobutylene | 16 |
| Tetra-isobutylene | 84 |
| | 100 |

EXAMPLE IV

Twenty parts by weight of di-isobutylene and 1 part phosphorus pentoxide were contacted at 100° C. for 3 hours. The material was cooled, filtered and distilled. The liquid product had the following composition:

*Table V*

| | Volume per cent |
|---|---|
| Di-isobutylene | 50 |
| Tetra-isobutylene | 50 |
| | 100 |

Examples III and IV show that phosphorus pentoxide polymerizes di-isobutylene to tetra-isobutylene over a wide range of temperature and that the reaction proceeds more rapidly at higher temperatures than at lower.

EXAMPLE V

Twenty parts by weight of freshly prepared di-isobutylene and 1 part phosphorus pentoxide were agitated at room temperature for 4 hours. The product was filtered and distilled. The following composition was found:

*Table VI*

| | Volume per cent |
|---|---|
| Di-isobutylene | 25 |
| Tetra-isobutylene | 75 |
| | 100 |

EXAMPLE VI

The run cited in Example V was repeated using di-isobutylene which had become partially oxidized by contact with air. The product had the following composition:

*Table VII*

| Component: | Volume per cent |
|---|---|
| Di-isobutylene | 96 |
| Tetra-isobutylene | 4 |
| | 100 |

Examples V and VI show that, in order to produce high yields of tetraisobutylene from di-isobutylene using phosphorus pentoxide, the di-isobutylene must be substantially free from oxidation products.

Many variations in the apparatus or operation of my process may be found desirable in connection with specific embodiments and various modifications may be readily made by one skilled in the art in the light of the present disclosure. The various polymerization steps may be operated continuously or intermittently in batches as may be found most desirable for any particular case and the particular conditions used. The drawing is, of course, diagrammatic and the application of my invention on a commercial scale will necessitate the use of much equipment such as pumps, heaters, coolers, fractionators, and the like not shown in detail but which may be readily applied and adapted for any particular installation by one skilled in the art. Separators, such as 14 and 28, will advantageously comprise several individual units such as filters, fractional distillation columns, strippers, accumulators and the like equipment well known in the separating art. The general process and possible material flows have been disclosed and this together with the specific examples are believed to be sufficient to serve as efficient guides.

I claim:

1. A process for producing high-boiling hydrocarbons from lower-boiling hydrocarbons, which comprises passing di-isobutylene to a polymerization zone and contacting said di-isobutylene in the liquid phase in said zone with phosphorus pentoxide at a temperature between 0° C. and 100° C. for a period of time such that an optimum amount of tetra-isobutylene is produced.

2. The process of claim 1 wherein the reaction time for the polymerization is between three and seven hours.

3. In a process for producing high-boiling hydrocarbons from lower-boiling hydrocarbons, the steps which comprise passing di-isobutylene to a polymerization zone, contacting said di-isobutylene in the liquid phase in said zone with phosphorus pentoxide at a temperature between 0° C. and 100° C. for a period of time such as an optimum amount of tetra-isobutylene is produced, passing effluent from said polymerization zone to a separating means, separating therefrom a fraction rich in di-isobutylene and returning said fraction to the polymerization zone, separating also therefrom a fraction comprising essentially tetra-isobutylene, and removing said fraction from the process.

4. A process for the production of tetra-isobutylene by polymerization of di-isobutylene without the formation of substantial amounts of tri-isobutylene, which comprises subjecting di-isobutylene in the liquid phase to the action of phosphorus pentoxide at a temperature within the range of approximately 0° C. to approximately 100° C.

5. A process for the production of tetra-isobutylene by polymerization of di-isobutylene without the formation of substantial amounts of tri-isobutylene, which comprises subjecting di-isobutylene in the liquid phase to the action of phosphorus pentoxide at a temperature within the range of approximately 20° to approximately 60° C.

GRANT C. BAILEY.